Patented Sept. 27, 1949

2,482,946

UNITED STATES PATENT OFFICE 2,482,946

MONOAZO DYESTUFFS AND A PROCESS OF MAKING SAME

Willy Steinemann, Basel, Switzerland, assignor to Sandoz Limited, Fribourg, Switzerland, a Swiss firm No Drawing. Application August 7, 1945, Serial No. 609,499. In Switzerland September 1, 1944

4 Claims. (Cl. 260—151)

The present invention relates to new monoazo dyestuffs and their chrome complex compounds which dye animal fibres in green, blue and grey shades and to a process for their preparation.

It has been found that new valuable monoazo dyestuffs can be prepared by coupling diazotized o-amino-phenolsulphonic acids or their derivatives substituted in the nucleus, with 1-(7-hydroxynaphthyl)-carbamic acid alkyl esters and transforming the azo dyestuffs thus obtained into their chrome complex compounds on the fibre or in substance.

As diazo compounds which are useful for the preparation of the new dyestuffs the following compounds may be enumerated: 2-aminophenol-4-sulphonic acid, 2-aminophenol-4.6-disulphonic acid, 4-chloro-2-aminophenol-6-sulphonic acid, 6-chloro-2-aminophenol-4-sulphonic acid, 3.4.6-trichloro-2-aminophenol-5-sulphonic acid, 4-nitro-2-aminophenol-6-sulphonic acid, 6-nitro-2-aminophenol-4-sulphonic acid, 4-chloro-2-aminophenol-5-sulphonic acid, 4-methyl-2-aminophenol-5-sulphonic acid, 4-benzoylamino-2-aminophenol-6-sulphonic acid, 6-benzoyl-amino-2-aminophenol-4-sulphonic acid, 2-aminophenol-4-carbamic acid-ethylester-6-sulphonic acid, 2-aminophenol-6-carbamic acid ethylester-4-sulphonic acid and so on.

The coupling compounds which are used according to the present invention can be obtained by treating 1.7-aminonaphthol in water or in an organic inert solvent and in presence of an acid binding agent, like sodium carbonate or calcium carbonate, with chloroformic acid alkylesters. These new compounds are obtained generally with a good yield. The 1-(7-hydroxynaphthyl)-carbamic acid alkyl esters are compounds which are difficultly soluble in water, but easily soluble in ethanol and acetone. They are crystallized powders possessing for instance the following characteristic melting points:

1-(7-hydroxynaphthyl)-carbamic acid methylester M. P. 104° C.
1-(7-hydroxynaphthyl)-carbamic acid ethylester M. P. 118–119° C.
1-(7-hydroxynaphthyl)-carbamic acid-(β-chlorethylester) M. P. 116° C.
1-(7-hydroxynaphthyl)-carbamic acid-n-butylester M. P. 154–155° C. (with decomposition).

The coupling of the new compounds with the diazo derivatives listed above is carried out in the usual way, the azo dyestuffs being obtained with a good yield.

The new, well crystallizing dyestuffs are excellent after-chroming dyestuffs, most of them being very suitable for the so-called monochrome-dyeing process. They can also be transformed in substance into valuable, also well crystallized chrome complex compounds, in connection with which it has been observed that the carbamic acid ester group is not saponified in mineral medium. The chrome-free dyestuffs dye wool according to the after-chrome- or monochrome-dyeing process in grey, greenish-blue, and olive shades of good fastness to light and very good fastness to washing and milling. The chrome-complex compounds dye wool from an acid bath in similar, but more brilliant shades possessing valuable fastness properties and very good leveling quality.

The following examples, without being limitative, illustrate the present invention, the parts being by weight.

Example 1

29.5 parts of 3.4.6-trichloro-2-aminophenol-5-sulphonic acid are diazotized in the usual way and coupled in the presence of a calculated quantity of sodium carbonate with 23.1 parts of 1-(7-hydroxynaphthyl)-carbamic acid ethyl ester dissolved in 300 parts of water in the presence of 4 parts of sodium hydroxide. The dyestuff thus obtained is salted out and isolated. In dry state it is a dark blue powder which is soluble in concentrated sulphuric acid with a bluish-red coloration. By the monochrome- and after-chrome-dyeing processes it dyes wool in greenish-blue to grey shades, which possess excellent fastness properties to light, to milling and to washing.

In order to prepare the chrome complex compound the dyestuff isolated as above described is dissolved in 1600 parts of water and, after addition of 75 parts of chrome alum and 25 parts of formic acid, it is boiled during 24 hours under reflux. The chrome complex thus formed is salted out and filtered. In dry state it is a dark-blue powder which is soluble in concentrated sulphuric acid with a bluish-red coloration. It dyes wool from an acid bath in level greenish-blue shades which possess good fastness to light and a very good fastness to milling and washing.

Example 2

22.4 parts of 4-chloro-2-aminophenol-6-sulfonic acid are diazotized and coupled in presence of a calculated quantity of sodium carbonate with 21.7 parts of 1-(7-hydroxynaphthyl)-carbamic acid methylester dissolved in 300 parts of water in presence of 4 parts of sodium hydroxide.

The new dyestuff is isolated by salting it out and filtering. In dry state it is a dark violet powder which is soluble in concentrated sulphuric acid with a bluish-red coloration. This dyestuff is an excellent monochrome dyestuff which dyes wool from a neutral bath in brilliant blue-green shades possessing very good fastness to washing, to milling and to light.

For the preparation of the chrome-complex compound, the dyestuff is isolated in the above described manner, suspended in 1600 parts of water containing 75 parts of 10% sulphuric acid and 75 parts of chrome alum and boiled under reflux for 20 hours. After cooling down to room temperature, the chrome-complex compound precipitates totally in well crystallized form. In dry state it is a dark-violet powder which is soluble in concentrated sulphuric acid with a bluish-red coloration. It dyes wool from an acid bath in blue shades possessing excellent fastness to washing and milling and a good fastness to light.

The following table shows a number of examples of dyestuffs prepared according to the present invention:

fastness properties to washing and to milling and a good fastness to light.

3. A monoazo dyestuff of the formula

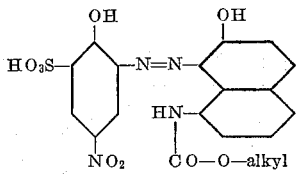

which dyestuff, on treatment with chromium, produces on wood olive-green shades possessing very good fastness properties to washing, to milling and to light.

4. A chrome-complex compound of the monoazo dyestuffs of the formula

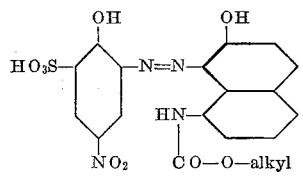

|   | Diazo compound | Azo compound | Shade after-chromed | Shade of the chrome complex |
|---|---|---|---|---|
| 1 | 4-chloro-2-amino-phenol-6-sulphonic acid | 1-(7-hydroxynaphthyl)-carbamic acid-ethyl ester | blue-grey | blue. |
| 2 | ___do___ | 1-(7-hydroxynaphthyl)-carbamic acid-n- butyl-ester. | ___do___ | Do. |
| 3 | ___do___ | 1-(7-hydroxynaphthyl)-carbamic acid-(β-chlor-ethyl)-ester. | ___do___ | violet-grey. |
| 4 | 4-chloro-2-amino-phenol-5-sulphonic acid | 1-(7-hydroxynaphthyl)-carbamic acid - ethyl-ester. | ___do___ | blue. |
| 5 | 2-aminophenol-4.6-disulphonic acid | 1-(7-hydroxynaphthyl)-carbamic acid ehyl ester. | violet-grey | blue-grey. |
| 6 | 6-nitro-2-amino-phenol-4-sulphonic acid | ___do___ | grey | grey-blue. |
| 7 | 4-nitro-2-amino-phenol-6-sulphonic acid | ___do___ | olive-green | olive-green. |
| 8 | 4-methyl-2-amino-phenol-5-sulphonic acid | ___do___ | blue-grey | blue-grey. |
| 9 | 2-amminophenol-4-sulphonic acid | ___do___ | reddish blue-grey | blue. |
| 10 | 4-benzoylamino-2-aminophenol-6-sulphonic acid | ___do___ | blue-grey | blue-grey. |
| 11 | 6-benzoylamino-2-aminophenol-4-sulphonic acid | ___do___ | reddish blue-grey | blue. |
| 12 | 2-aminophenol-4-carbamic acid-ethyl-ester-6-sulphonic acid. | ___do___ | blue-grey | greenish blue. |
| 13 | 2-aminophenol-6-carbamic acid-ethylester-4-sulphonic acid. | ___do___ | ___do___ | blue. |

What I claim is:

1. The monoazo dyestuff of the formula

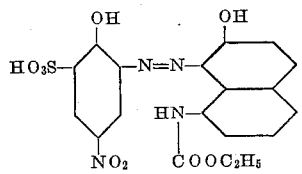

which dyestuff, on treatment with chromium, produces on wool olive-green shades possessing very good fastness properties to washing, to milling and to light.

2. The chrome-complex compound of the monoazo dyestuff of the formula

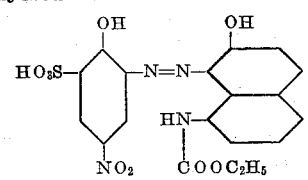

which compound is soluble in sulphuric acid with a bordeaux-red coloration and dyes animal fibres in olive-green shades possessing excellent fastness properties to washing and to milling and a good fastness to light.

which compound is soluble in sulphuric acid with a bordeaux-red coloration and dyes animal fibres in olive-green shades possessing excellent fastness properties to washing and to milling and a good fastness to light.

WILLY STEINEMANN.

REFERENCES CITED

The following references are of record in the file of this patent:

UNITED STATES PATENTS

| Number | Name | Date |
|---|---|---|
| 1,731,643 | Wagner | Oct. 15, 1929 |
| 2,276,174 | Fleischhauer | Mar. 10, 1942 |
| 2,288,518 | Fleischhauer | June 30, 1942 |
| 2,447,163 | Conzetti | Aug. 17, 1948 |